(12) United States Patent
Xing et al.

(10) Patent No.: US 12,453,292 B2
(45) Date of Patent: Oct. 21, 2025

(54) ALL-ELECTRICALLY-CONTROLLED SPINTRONIC NEURON DEVICE, NEURON CIRCUIT AND NEURAL NETWORK

(71) Applicant: Institute of Microelectronics, Chinese Academy of Sciences, Beijing (CN)

(72) Inventors: Guozhong Xing, Beijing (CN); Di Wang, Beijing (CN); Ming Liu, Beijing (CN)

(73) Assignee: Institute of Microelectronics, Chinese Academy of Sciences, Beijing (CN)

( * ) Notice: Subject to any disclaimer, the term of this patent is extended or adjusted under 35 U.S.C. 154(b) by 151 days.

(21) Appl. No.: 18/249,805

(22) PCT Filed: May 17, 2021

(86) PCT No.: PCT/CN2021/094074
§ 371 (c)(1),
(2) Date: Apr. 20, 2023

(87) PCT Pub. No.: WO2022/062427
PCT Pub. Date: Mar. 31, 2022

(65) Prior Publication Data
US 2023/0397504 A1    Dec. 7, 2023

(51) Int. Cl.
*H01L 29/82* (2006.01)
*G06N 3/063* (2023.01)
(Continued)

(52) U.S. Cl.
CPC ........... *H10N 52/101* (2023.02); *G06N 3/063* (2013.01); *H10N 52/85* (2023.02); *H10N 59/00* (2023.02)

(58) Field of Classification Search
CPC .... H01F 1/00–447; H01F 10/00–3295; H10N 50/85
See application file for complete search history.

(56) References Cited

U.S. PATENT DOCUMENTS

2011/0103143 A1* 5/2011 Ranjan ............... H10N 50/80
                                                         365/171
2013/0314978 A1* 11/2013 Currivan ............. G11C 11/1675
                                                         365/158
(Continued)

FOREIGN PATENT DOCUMENTS

CN          104347226 A      2/2015
CN          107368888 A      11/2017
(Continued)

OTHER PUBLICATIONS

Hassan et al., Magnetic domain wall neuron with lateral inhibition, Oct. 9, 2018 (Year: 2018).*
(Continued)

*Primary Examiner* — Ismail A Muse
(74) *Attorney, Agent, or Firm* — OSHA BERGMAN WATANABE & BURTON LLP

(57) ABSTRACT

Provided is an all-electrically-controlled spintronic neuron device, a neuron circuit and a neural network. The neuron device includes: a bottom antiferromagnetic pinning layer; a synthetic antiferromagnetic layer formed on the bottom antiferromagnetic pinning layer; a potential barrier layer formed on the ferromagnetic free layer, wherein a region of the ferromagnetic free layer directly opposite to the potential barrier layer forms a threshold region; a ferromagnetic reference layer formed on the potential barrier layer; wherein the potential barrier layer, the ferromagnetic reference layer and the ferromagnetic free layer form a magnetic tunnel junction; a first antiferromagnetic pinning layer and a second antiferromagnetic pinning layer formed on an exposed region of the ferromagnetic free layer except the region directly opposite the potential barrier layer, and located on two sides of the potential barrier layer; and a first electrode formed on the ferromagnetic reference layer.

12 Claims, 5 Drawing Sheets

(51) Int. Cl.
*H10N 52/00* (2023.01)
*H10N 52/85* (2023.01)
*H10N 59/00* (2023.01)

(56) References Cited

U.S. PATENT DOCUMENTS

| | | | |
|---|---|---|---|
| 2015/0318004 A1* | 11/2015 | Singleton | G11B 5/398 |
| | | | 156/60 |
| 2017/0249550 A1 | 8/2017 | Sengupta et al. | |
| 2018/0261269 A1* | 9/2018 | Roiz Wilson | G11C 11/1659 |
| 2019/0251427 A1* | 8/2019 | Park | G06N 3/063 |
| 2019/0355895 A1* | 11/2019 | Song | H10N 50/85 |
| 2020/0242462 A1* | 7/2020 | Friedman | H10N 50/80 |
| 2020/0341079 A1* | 10/2020 | Swerts | G01R 33/098 |
| 2021/0193913 A1* | 6/2021 | Ichikawa | H10N 50/10 |
| 2021/0232903 A1* | 7/2021 | Friedman | G06N 3/065 |
| 2024/0122075 A1* | 4/2024 | Xing | H10N 50/10 |

FOREIGN PATENT DOCUMENTS

| | | |
|---|---|---|
| CN | 111785828 A | 10/2020 |
| CN | 112599161 A | 4/2021 |
| CN | 112802515 A | 5/2021 |
| KR | 20190094641 A | 8/2019 |

OTHER PUBLICATIONS

International Search Report issued in International Application No. PCT/CN2021/094074 dated Jan. 27, 2022 (3 pages).
Written Opinion issued in International Application No. PCT/CN2021/094074 dated Jan. 27, 2022 (3 pages).

* cited by examiner

ALL-ELECTRICALLY-CONTROLLED SPINTRONIC NEURON DEVICE, NEURON CIRCUIT AND NEURAL NETWORK

CROSS-REFERENCE TO RELATED APPLICATION

This application is a Section 371 National Stage Application of International Application No. PCT/CN2021/094074, filed on May 17, 2021, entitled "ALL-ELECTRICALLY-CONTROLLED SPINTRONIC NEURON DEVICE, NEURON CIRCUIT AND NEURAL NETWORK", the content of which is hereby incorporated by reference in its entirety.

TECHNICAL FIELD

The present disclosure relates to a field of semiconductor technology, and in particular, to an all-electrically-controlled spintronic neuron device, a neuron circuit and a neural network.

BACKGROUND

A development of biological neural research promotes a neuromorphic computing or brain-inspired computing that simulates a human brain to become one of the mainstream trends of future development of computers. As an important direction of In-memory Computing applications, the neuromorphic computing is expected to further improve a computing power of a chip while significantly reducing a power consumption of a chip.

Advantages of emerging spintronic devices, such as non-volatility, high read/write speed, low power consumption, high density and high endurance, make the spintronic devices have significant advantages and application potential in a field of neuromorphic computing. The relevant research is mainly based on Magnetic Tunnel Junction (MTJ). The magnetic tunnel junction switches a magnetization direction of a free layer through the Spin Transfer Torque (STT) generated by a polarized current of a ferromagnetic reference layer or the Spin Orbit Torque (SOT) of a vertical injected spin current generated by Spin Hall Effect of a heavy metal. In this process, a relative magnetization direction of the ferromagnetic layer on two sides of the tunneling layer is switched, and a change of a resistance value may be characterized according to the tunneling magnetoresistance effect.

However, most of the current research is still focused on magnetic random access memories based on spin transfer torque and spin orbit torque (STT-MRAM, SOT-MRAM), and there is less research on neuromorphic devices (synapses, neurons, etc.). Therefore, the research of high performance neuromorphic devices has become another hot spot in a field of spintronics.

SUMMARY

In view of the above, a primary objective of the present disclosure is to provide an all-electrically-controlled spintronic neuron device, a neuron circuit and a neural network, which are intended to partially solve at least one of the above-mentioned technical problems.

In order to achieve the above-mentioned objective, the technical solution of the present disclosure includes:

According to one aspect of the present disclosure, there is provided an all-electrically-controlled spintronic neuron device, including:
  a bottom antiferromagnetic pinning layer;
  a synthetic antiferromagnetic layer formed on the bottom antiferromagnetic pinning layer, wherein the synthetic antiferromagnetic layer includes a bottom ferromagnetic layer, a synthetic antiferromagnetic coupling layer and a ferromagnetic free layer from bottom to top;
  a potential barrier layer formed on the ferromagnetic free layer, wherein a region of the ferromagnetic free layer directly opposite to the potential barrier layer forms a threshold region;
  a ferromagnetic reference layer formed on the potential barrier layer, wherein the potential barrier layer, the ferromagnetic reference layer and the ferromagnetic free layer form a magnetic tunnel junction;
  a first antiferromagnetic pinning layer and a second antiferromagnetic pinning layer formed on an exposed region of the ferromagnetic free layer except the region directly opposite to the potential barrier layer, and located on two sides of the potential barrier layer, wherein regions of the ferromagnetic free layer directly opposite to the first antiferromagnetic pinning layer and the second antiferromagnetic pinning layer form a first pinning region and a second pinning region respectively; and
  a first electrode formed on the ferromagnetic reference layer.

According to another aspect of the present disclosure, there is further provided a neuron circuit, including a plurality of neuron branches connected in parallel;
  wherein each of the neuron branches includes a neuron device described above and a circuit having a negative differential resistance characteristic connected in series, and the circuit having a negative differential resistance characteristic includes a transistor or a tunneling diode.

According to another aspect of the present disclosure, there is further provided a neural network, including:
  the neuron circuit described above;
  a synapse array, including N*M electronic synapses and M pre-neuron signal input signal lines, wherein the pre-neuron signal input signal line is configured to receive a neuron signal;
  wherein N is a row number of the synapse array, and M is a column number of the synapse array;
  input ends of N electronic synapses in a same column of the synapse array are connected;
  output ends of M electronic synapses in a same row of the synapse array are connected;
  wherein, after output ends of M electronic synapses in a same row of the synapse array are connected, the output ends are connected with one of the plurality of neuron branches of the neuron circuit;
  wherein, after input ends of N electronic synapses in a same column of the synapse array are connected, the input ends are connected with one of the M pre-neuron signal input signal lines;
  a plurality of output circuits, wherein an input end of each output circuit in the plurality of output circuits is connected with an output end of one of the neuron branches in the neuron circuit.

DETAILED DESCRIPTION OF EMBODIMENTS

Figure 1:
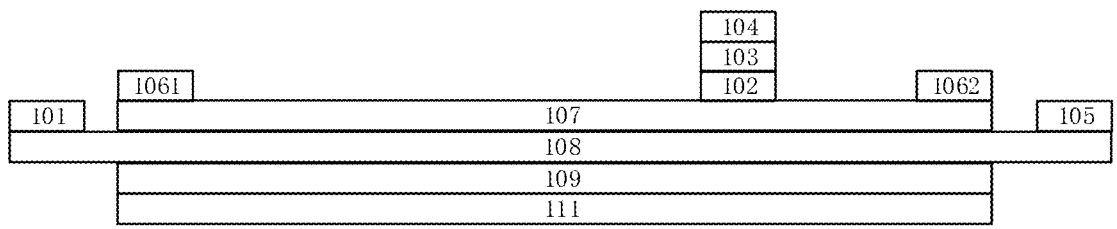
FIG. 1 schematically shows a structure diagram of an all-electrically-controlled spintronic neuron device provided in Embodiment 1 of the present disclosure.

Embodiments of the present disclosure will be described below with reference to the accompanying drawings. It should be understood, however, that these descriptions are merely exemplary and are not intended to limit the scope of the present disclosure. In the following detailed descriptions, for purposes of explanation, numerous specific details are set forth in order to provide a thorough understanding of embodiments of the present disclosure. It is obvious, however, that one or more embodiments may be implemented without these specific details. In addition, in the following descriptions, descriptions of well-known structures and technologies are omitted to avoid unnecessarily obscuring the concept of the present disclosure.

Terms used herein are for the purpose of describing embodiments only and are not intended to limit the present disclosure. Terms "comprising", "including" and the like used herein specify a presence of the feature, step, operation and/or component, but do not preclude a presence or addition of one or more other features, steps, operations or components.

All terms (including technical and scientific terms) used herein have the same meaning as commonly understood by those of ordinary skill in the art, unless otherwise defined. It should be noted that the terms used herein should be construed to have meanings consistent with the context of the present description and should not be construed in an idealized or overly rigid manner.

In order to make the objectives, technical solutions and advantages of the present disclosure more apparent, the present disclosure will be described in further detail below with reference to specific embodiments and the accompanying drawings.

In the process of realizing the present disclosure, the inventor finds that the existing neuron device has at least the following problems.

The existing neuron devices generally only simulate a process of the integration and leakage of the neuron. Some devices that simulate a leaky characteristic of the neuron need to deposit a large area of hard magnets under the neuron device, and when the neuron device is integrated and applied, the neuron device will have an impact on other components in an integrated circuit, which is not conducive to integration.

When the existing neuron devices are applied in a neural network, a mutual inhibition between the existing neuron devices is realized through stray fields between the neuron devices. However, the stray fields have limited scope of action, and may only achieve local inhibition, but may not achieve global inhibition, and may not achieve a global "winner takes all" function.

The present disclosure provides an all-electrically-controlled spintronic neuron device, including a bottom antiferromagnetic pinning layer, a synthetic antiferromagnetic layer, a potential barrier layer, a ferromagnetic reference layer, a first antiferromagnetic pinning layer, a second antiferromagnetic pinning layer, and a first electrode.

The bottom antiferromagnetic pinning layer.

The synthetic antiferromagnetic layer is formed on the bottom antiferromagnetic pinning layer, wherein the synthetic antiferromagnetic layer includes a bottom ferromagnetic layer, a synthetic antiferromagnetic coupling layer and a ferromagnetic free layer from bottom to top.

The potential barrier layer is formed on the ferromagnetic free layer, wherein a region of the ferromagnetic free layer directly opposite to the potential barrier layer forms a threshold region.

The ferromagnetic reference layer is formed on the potential barrier layer, wherein the potential barrier layer, the ferromagnetic reference layer and the ferromagnetic free layer form a magnetic tunnel junction;

The first antiferromagnetic pinning layer and the second antiferromagnetic pinning layer are formed on an exposed region of the ferromagnetic free layer except the region directly opposite to the potential barrier layer, and located on two sides of the potential barrier layer, wherein regions of the ferromagnetic free layer directly opposite to the first antiferromagnetic pinning layer and the second antiferromagnetic pinning layer form a first pinning region and a second pinning region respectively.

The first electrode is formed on the ferromagnetic reference layer.

Under the regulation and control of the full electric field, through the antiferromagnetic coupling effect of the synthetic antiferromagnetic layer on the ferromagnetic free layer, an automatic retreat movement of the magnetic domain wall in the ferromagnetic free layer is realized to simulate a self-leaky function of the neuron device. Then, when a spin polarized current is injected, the spin orbit torque is used to drive a motion of a magnetic domain wall in the ferromagnetic free layer to simulate an integrate function of the neuron device, and then the neuron device with highly reliable leaky-integrate-reset characteristics is integrated and realized.

The specific components and structures of the all-electrically-controlled spintronic neuron device of the present disclosure are described in detail below in combination with the accompanying drawings.

Specific details are set forth in the following description to facilitate a thorough understanding of the present disclosure. However, the present disclosure may be implemented in a variety of other ways different from those described herein. Those skilled in the art may make similar extensions without violating the spirit and teachings of the present disclosure. Therefore, the present disclosure is not limited by the specific implementation disclosed below.

Figure 3:
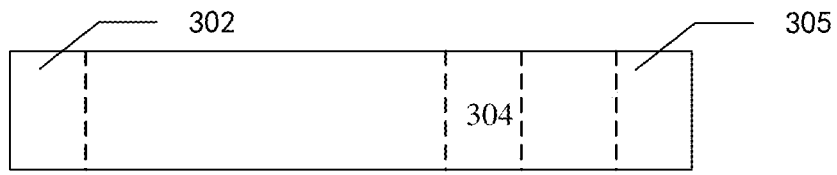
FIG. 3 schematically shows a top view of a ferromagnetic free layer of an all-electrically-controlled spintronic neuron device provided in embodiments of the present disclosure.

As shown in FIG. 1 and FIG. 3, Embodiment 1 of the present disclosure provides an all-electrically-controlled spintronic neuron device, including a bottom antiferromagnetic pinning layer 111, a synthetic antiferromagnetic layer 110, a potential barrier layer 102, a ferromagnetic reference layer 103, a first antiferromagnetic pinning layer 1061, a second antiferromagnetic pinning layer 1062, a first electrode 104, a second electrode 101, and a third electrode 105.

The bottom antiferromagnetic pinning layer 111.

The synthetic antiferromagnetic layer 110 is formed on the bottom antiferromagnetic pinning layer 111, wherein the synthetic antiferromagnetic layer 110 includes a bottom ferromagnetic layer 109, a synthetic antiferromagnetic coupling layer 108 and a ferromagnetic free layer 107 from bottom to top.

The potential barrier layer 102 is formed on the ferromagnetic free layer, wherein a region of the ferromagnetic free layer directly opposite to the potential barrier layer 102 forms a threshold region 304.

The ferromagnetic reference layer 103 formed on a potential barrier layer 102, wherein the potential barrier layer 102, the ferromagnetic reference layer 103 and the ferromagnetic free layer form a magnetic tunnel junction.

According to embodiments of the present disclosure, the shape of the potential barrier layer 102 and the ferromagnetic reference layer 103 may be, for example, rectangular, but not limited this, and may also be, for example, circular or elliptical.

The first antiferromagnetic pinning layer 1061 and the second antiferromagnetic pinning layer 1062 are formed on an exposed region of the ferromagnetic free layer except the region directly opposite to the potential barrier layer 102, and are located on two sides of the potential barrier layer 102, wherein regions of the ferromagnetic free layer directly opposite to the first antiferromagnetic pinning layer 1061 and the second antiferromagnetic pinning layer 1062 form a first pinning region 302 and a second pinning region 305 respectively.

According to embodiments of the present disclosure, the first pinning region 302 and the second pinning region 305 may be formed by changing a local thickness of the ferromagnetic free layer 107.

According to embodiments of the present disclosure, the first antiferromagnetic pinning layer 1061 and the second antiferromagnetic pinning layer 1062 may have opposite magnetization directions.

The first electrode 104 is formed on the ferromagnetic reference layer 103.

The second electrode 101 and the third electrode 105 are formed on an exposed region of the synthetic antiferromagnetic coupling layer 108 except the ferromagnetic free layer, and the second electrode 101 and the third electrode 105 are located on two sides of the synthetic antiferromagnetic coupling layer 108.

According to embodiments of the present disclosure, a material of the synthetic antiferromagnetic coupling layer 108 includes at least one of: Ta or W.

According to embodiments of the present disclosure, by using Ta or W as the material of the synthetic antiferromagnetic coupling layer 108, the synthetic antiferromagnetic coupling layer 108, the ferromagnetic free layer 107 and the bottom ferromagnetic layer 109 may form the synthetic antiferromagnetic layer 110, so as to generate RKKY antiferromagnetic coupling effect.

According to embodiments of the present disclosure, by using heavy metal materials such as Ta or W as the material of the synthetic antiferromagnetic coupling layer 108, a current flowing through the synthetic antiferromagnetic coupling layer 108 may also produce a Spin Hall effect, that is, a spin current in a vertical direction may be generated, and a drive of the magnetic domain wall in the ferromagnetic free layer 107 may be realized.

According to embodiments of the present disclosure, materials of the ferromagnetic reference layer 103, the ferromagnetic free layer 107 and the bottom ferromagnetic layer 109 may include ferromagnetic materials with perpendicular magnetic anisotropy.

According to embodiments of the present disclosure, a material of the ferromagnetic reference layer 103 may include, for example, at least one of: CoFeB, Co/Pt, CoFeAl, Co/Pd, or CoFe.

According to embodiments of the present disclosure, a material of the ferromagnetic free layer 107 may include, for example, at least one of: CoFeB, Co/Pt, CoFeAl, Co/Pd, or CoFe.

According to embodiments of the present disclosure, a material of the bottom ferromagnetic layer 109 may include, for example, at least one of: CoFeB, Co/Pt, CoFeAl, Co/Pd, or CoFe.

According to embodiments of the present disclosure, materials of the first antiferromagnetic pinning layer 1061, the second antiferromagnetic pinning layer 1062 and the bottom antiferromagnetic pinning layer 111 may include antiferromagnetic materials.

According to embodiments of the present disclosure, a material of the first antiferromagnetic pinning layer 1061 may, for example, include at least one of: IrMn, FeMn, NiMn, CoMn, PtMn, $Mn_2Au$, NiO, or MnO.

According to embodiments of the present disclosure, a material of the second antiferromagnetic pinning layer 1062 may, for example, include at least one of: IrMn, FeMn, NiMn, CoMn, PtMn, $Mn_2Au$, NiO, or MnO.

According to embodiments of the present disclosure, a material of the bottom antiferromagnetic pinning layer 111 may include, for example, at least one of: IrMn, FeMn, NiMn, CoMn, PtMn, $Mn_2Au$, NiO, or MnO.

According to embodiments of the present disclosure, a material of the potential barrier layer 102 includes at least one of MgO or $Al_2O_3$.

According to embodiments of the present disclosure, a material of the first electrode 104 includes at least one of Cu or Au.

According to embodiments of the present disclosure, a material of the second electrode 101 includes at least one of Cu or Au.

According to embodiments of the present disclosure, a material of the third electrode 105 includes at least one of Cu or Au.

According to embodiments of the present disclosure, a current may be passed between the second electrode 101 and the third electrode 105, and when a current is passed between the second electrode 101 and the third electrode 105, a spin orbit coupling effect will be generated on the synthetic antiferromagnetic coupling layer 108. The current flows through the synthetic antiferromagnetic coupling layer 108. Due to the spin orbit coupling effect, a spin current perpendicular to a direction of the synthetic antiferromagnetic coupling layer 108 will be generated, and then a spin orbit torque is generated in the ferromagnetic free layer 107, and the spin orbit torque drives the magnetic domain wall in the ferromagnetic free layer 107 to move in a +x direction, thus simulating the integrate process of the neuron. When there is no current applied between the second electrode 101 and the third electrode 105, the ferromagnetic free layer 107 and the bottom ferromagnetic layer 109 in the synthetic antiferromagnetic layer 110 generate antiferromagnetic coupling effect under an action of the synthetic antiferromagnetic coupling layer 108, and the magnetic domain wall in the ferromagnetic free layer 107 moves in a −x direction under a drive of the antiferromagnetic coupling effect, thus simulating the leaky process of the neuron.

Figure 2:
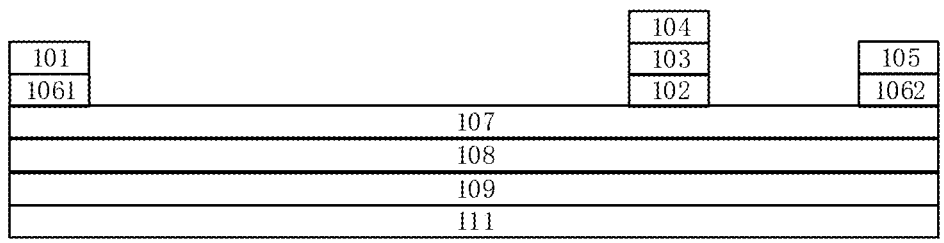
FIG. 2 schematically shows a structure diagram of an all-electrically-controlled spintronic neuron device provided in Embodiment 2 of the present disclosure.

As shown in FIG. 2 and FIG. 3, Embodiment 2 of the present disclosure provides an all-electrically-controlled spintronic neuron device, including a bottom antiferromagnetic pinning layer 111, a synthetic antiferromagnetic layer 110, a potential barrier layer 102, a ferromagnetic reference layer 103, a first antiferromagnetic pinning layer 1061, a second antiferromagnetic pinning layer 1062, a first electrode 104, a second electrode 101, and a third electrode 105.

The bottom antiferromagnetic pinning layer 111.

The synthetic antiferromagnetic layer 110 is formed on the bottom antiferromagnetic pinning layer 111, wherein the synthetic antiferromagnetic layer 110 includes the bottom ferromagnetic layer 109, the synthetic antiferromagnetic coupling layer 108 and the ferromagnetic free layer 107 from bottom to top.

The potential barrier layer 102 is formed on the ferromagnetic free layer, wherein a region of the ferromagnetic free layer directly opposite to the potential barrier layer 102 forms a threshold region 304.

The ferromagnetic reference layer 103 is formed on a potential barrier layer 102, wherein the potential barrier layer 102, the ferromagnetic reference layer 103 and the ferromagnetic free layer form a magnetic tunnel junction.

According to embodiments of the present disclosure, a shape of the ferromagnetic reference layer 103 may be, for example, rectangular, but not limited this, and may also be, for example, circular or elliptical.

The first antiferromagnetic pinning layer 1061 and the second antiferromagnetic pinning layer 1062 are formed on an exposed region of the ferromagnetic free layer except the potential barrier layer 102, and the first antiferromagnetic pinning layer 1061 and the second antiferromagnetic pinning layer 1062 are located on two sides of the potential barrier layer 102. Regions of the ferromagnetic free layer directly opposite to the first antiferromagnetic pinning layer 1061 and the second antiferromagnetic pinning layer 1062 form a first pinning region 302 and a second pinning region 305, respectively.

According to embodiments of the present disclosure, the first pinning region 302 and the second pinning region 305 may be formed by changing a local thickness of the ferromagnetic free layer 107.

According to embodiments of the present disclosure, the first antiferromagnetic pinning layer 1061 and the second antiferromagnetic pinning layer 1062 may have opposite magnetization directions.

The first electrode 104 is formed on the ferromagnetic reference layer 103.

The second electrode 101 and the third electrode 105 are respectively formed on the first antiferromagnetic pinning layer 1061 and the second antiferromagnetic pinning layer 1062.

According to embodiments of the present disclosure, by injecting a current between the second electrode 101 and the third electrode 105, a spin transfer torque is generated in the ferromagnetic free layer 107 to drive a motion of a magnetic domain wall in the ferromagnetic free layer 107 and simulate the integrate process of the neuron.

According to embodiments of the present disclosure, the bottom antiferromagnetic pinning layer 111 has a first magnetization direction.

The bottom antiferromagnetic pinning layer 111 pins a magnetization direction of the bottom ferromagnetic layer 109 in a second magnetization direction, and an antiferromagnetic coupling effect is generated in the ferromagnetic free layer 107. The magnetic domain wall in the ferromagnetic free layer 107 has a movement trend opposite to a driving direction of the spin polarized current, and a leaky process of the neuron is simulated. The second magnetization direction is opposite to the first magnetization direction.

According to embodiments of the present disclosure, the magnetization direction of the bottom ferromagnetic layer 109 is pinned in the second magnetization direction through the bottom antiferromagnetic pinning layer 111. The bottom antiferromagnetic pinning layer 111 has a same area as the bottom ferromagnetic layer 109, and the bottom antiferromagnetic pinning layer 111 will not affect other structures of the all-electrically-controlled spintronic neuron device except the bottom ferromagnetic layer 109, thereby facilitating the integrated application of the all-electrically-controlled spintronic neuron device.

FIG. 3 schematically shows a top view of a ferromagnetic free layer provided in embodiments of the present disclosure.

According to embodiments of the present disclosure, as shown in FIG. 3, the first pinning region 302 and the second pinning region 305 have opposite magnetization directions.

According to embodiments of the present disclosure, the first antiferromagnetic pinning layer 1061 may pin the magnetization direction of the first pinning region in a first pinning direction. The second antiferromagnetic pinning layer 1062 may pin the magnetization direction of the first pinning region in a second pinning direction.

According to embodiments of the present disclosure, since the first antiferromagnetic pinning layer 1061 and the second antiferromagnetic pinning layer 1062 have opposite magnetization directions, the magnetization direction of the first pinning region is opposite to that of the second pinning region, so that the magnetic domain wall in the ferromagnetic free layer 107 may move between the first pinning region 302 and the second pinning region 305 without annihilation.

According to embodiments of the present disclosure, when the magnetic domain wall moves between the first pinning region 302 and the threshold region 304, the neuron device is in a normal state. When the magnetic domain wall moves between the threshold region 304 and the second pinning region 305, the neuron device is in an excited state.

According to embodiments of the present disclosure, when the magnetic domain wall moves between the first pinning region 302 and the threshold region 304, and the neuron device is in a normal state, a resistance of the magnetic tunnel junction may be an antiparallel state resistance. When the magnetic domain wall moves between the threshold region 304 and the second pinning region 305, and the neuron device is in an excited state, a resistance of the magnetic tunnel junction may be a parallel state resistance.

According to embodiments of the present disclosure, when a moving position of the magnetic domain wall in the ferromagnetic free layer 107 exceeds the threshold region 304, the magnetic tunnel junction is switched from an antiparallel state to a parallel state and outputs a spike pulse, so as to simulate a leaky process of the neuron.

According to embodiments of the present disclosure, the magnetization direction of the first pinning region or the magnetization direction of the second pinning region is the same as the first magnetization direction.

According to embodiments of the present disclosure, the magnetization direction of the first pinning region and the first magnetization direction of the bottom antiferromagnetic pinning layer 111 may be the same, for example, the magnetization direction of the first pinning region and the first magnetization direction are both a +z direction, and the magnetization direction of the second pinning region is opposite to the magnetization direction of the first pinning region, thus the magnetization direction of the second pinning region is opposite, and may be a −z direction. However, the present disclosure is not limited to this. For example, the magnetization direction of the first pinning region and the first magnetization direction are both the −z direction, and the magnetization direction of the second pinning region is opposite to the magnetization direction of the first pinning region, thus the magnetization direction of the second pinning region is opposite, and may be the +z direction.

According to embodiments of the present disclosure, a material of the synthetic antiferromagnetic coupling layer 108 includes at least one of: Ta, W, Ru, V, Cr, Rh, Nd, Mo, or Re.

According to embodiments of the present disclosure, by using Ta, W, Ru, V, Cr, Rh, Nd, Mo, Re and the like as the material of the synthetic antiferromagnetic coupling layer 108, the synthetic antiferromagnetic coupling layer 108, the ferromagnetic free layer 107 and the bottom ferromagnetic layer 109 may form the synthetic antiferromagnetic layer 110, generating RKKY antiferromagnetic coupling effect.

According to embodiments of the present disclosure, materials of the ferromagnetic reference layer 103, the ferromagnetic free layer 107 and the bottom ferromagnetic layer 109 may include ferromagnetic materials with perpendicular magnetic anisotropy.

According to embodiments of the present disclosure, a material of the ferromagnetic reference layer 103 may include, for example, at least one of: CoFeB, Co/Pt, CoFeAl, Co/Pd, or CoFe.

According to embodiments of the present disclosure, a material of the ferromagnetic free layer 107 may include, for example, at least one of: CoFeB, Co/Pt, CoFeAl, Co/Pd, or CoFe.

According to embodiments of the present disclosure, a material of the bottom ferromagnetic layer 109 may include, for example, at least one of: CoFeB, Co/Pt, CoFeAl, Co/Pd, and CoFe.

According to embodiments of the present disclosure, materials of the first antiferromagnetic pinning layer 1061, the second antiferromagnetic pinning layer 1062 and the bottom antiferromagnetic pinning layer 111 may include antiferromagnetic materials.

According to embodiments of the present disclosure, a material of the first antiferromagnetic pinning layer 1061 may, for example, include at least one of: IrMn, FeMn, NiMn, CoMn, PtMn, $Mn_2Au$, NiO, or MnO.

According to embodiments of the present disclosure, a material of the second antiferromagnetic pinning layer 1062 may, for example, include at least one of: IrMn, FeMn, NiMn, CoMn, PtMn, $Mn_2Au$, NiO, or MnO.

According to embodiments of the present disclosure, a material of the bottom antiferromagnetic pinning layer 111 may include, for example, at least one of: IrMn, FeMn, NiMn, CoMn, PtMn, $Mn_2Au$, NiO, or MnO.

According to embodiments of the present disclosure, a material of the potential barrier layer 102 includes at least one of: MgO or $Al_2O_3$.

According to embodiments of the present disclosure, a material of the first electrode 104 includes at least one of: Cu or Au.

According to embodiments of the present disclosure, a material of the second electrode 101 includes at least one of: Cu or Au.

According to embodiments of the present disclosure, a material of the third electrode 105 includes at least one of: Cu or Au.

According to embodiments of the present disclosure, when a strength of an antiferromagnetic coupling effect on the ferromagnetic free layer 107 is fixed, and a density of the current is increased, an integrate velocity of the neuron device is accelerated.

Figure 4:
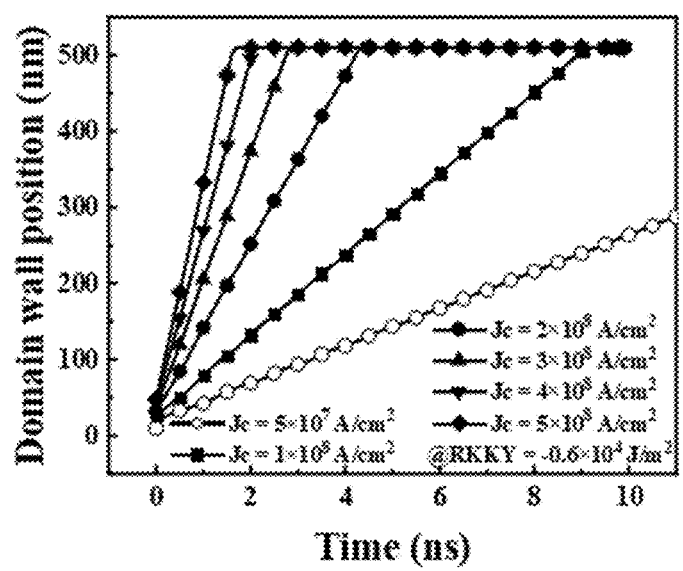
FIG. 4 schematically shows a curve diagram of a magnetic domain wall position changing with time under different current amplitudes when RKKY (Ruderman-Kittel-Kasuya-Yosida Interaction) intensity is $-0.6 \times 10^4$ $J/m^2$ in an integrate process of an all-electrically-controlled spintronic neuron device provided in embodiments of the present disclosure.

FIG. 4 schematically shows a curve diagram of a magnetic domain wall position changing with time under different current amplitudes when RKKY (Ruderman-Kittel-Kasuya-Yosida Interaction) intensity is $-0.6 \times 10^4$ $J/m^2$ in an integrate process of an all-electrically-controlled spintronic neuron device provided in embodiments of the present disclosure.

Figure 5:
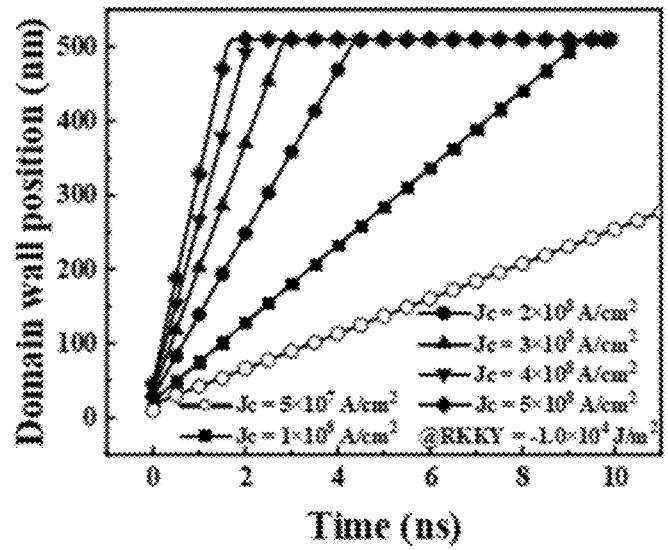
FIG. 5 schematically shows a curve diagram of a magnetic domain wall position changing with time under different current amplitudes when RKKY intensity is $-1.0 \times 10^4$ $J/m^2$ in an integrate process of an all-electrically-controlled spintronic neuron device provided in embodiments of the present disclosure.

A position of the magnetic domain wall may represent a distance between the magnetic domain wall and the first pinning region. As shown in FIG. 4, with an increase of a current density, the time required for the magnetic domain wall to move from the first pinning region to the second pinning region is significantly reduced. Similarly, FIG. 5 schematically shows a curve diagram of a magnetic domain wall position changing with time under different current amplitudes when RKKY intensity is $-1.0 \times 10^4$ $J/m^2$ in an integrate process of an all-electrically-controlled spintronic neuron device provided in embodiments of the present disclosure. A position of the magnetic domain wall may represent a distance between the magnetic domain wall and the first pinning region. Comparing FIG. 4 with FIG. 5, in the integrate process of the neuron, an intensity of larger RKKY may inhibit the movement of magnetic domain wall to a certain extent, that is, an integrate velocity of the neuron may be adjusted by modulating the injected current density and RKKY intensity.

According to embodiments of the present disclosure, the leaky velocity of the neuron is accelerated by increasing the intensity of the antiferromagnetic coupling effect on the ferromagnetic free layer.

Figure 6:
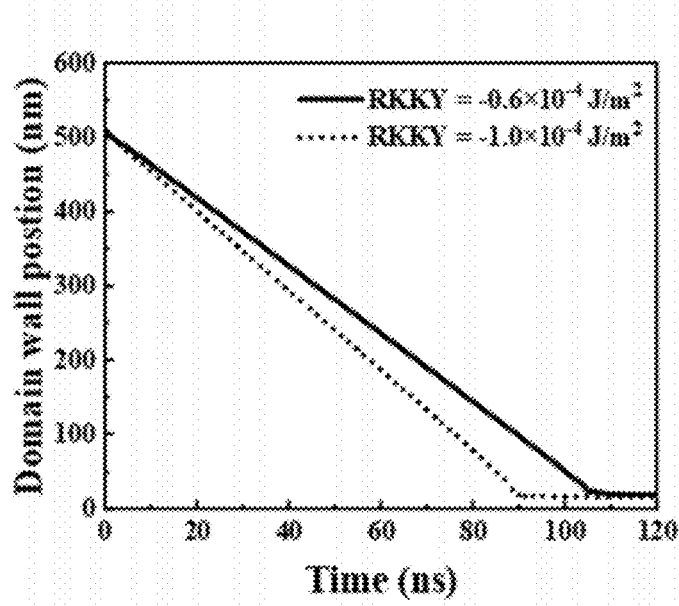
FIG. 6 schematically shows a curve diagram of a magnetic domain wall position changing with time under different RKKY intensities during a leaky process of an all-electrically-controlled spintronic neuron device provided in embodiments of the present disclosure.

FIG. 6 schematically shows a curve diagram of a magnetic domain wall position changing with time under different RKKY intensities during a leaky process of an allelectrically-controlled spintronic neuron device provided in embodiments of the present disclosure. A position of the magnetic domain wall may represent a distance between the magnetic domain wall and the first pinning region. It may be seen from FIG. 6 that with an increase of RKKY intensity, the leaky velocity of the neuron is higher, so that the leaky velocity of the neuron device may be changed by modulating RKKY intensity.

According to embodiments of the present disclosure, the RKKY intensity may be modulated by changing a thickness of the synthetic antiferromagnetic coupling layer. However, the present disclosure is not limited to this, and Ru/Ta double-layer material may also be used as the material of the synthetic antiferromagnetic coupling layer to adjust the RKKY intensity.

According to embodiments of the present disclosure, Dzyaloshinskii-Moriya interaction (DMI) is also produced between the synthetic antiferromagnetic coupling layer and the ferromagnetic free layer. Therefore, the integrate and leaky velocity of the neuron device may also be modulated by modulating the DMI intensity.

Figure 7:
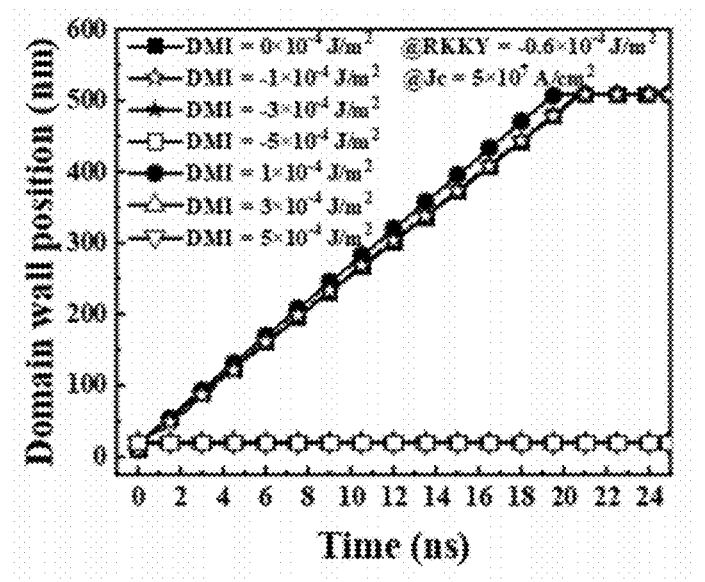
FIG. 7 schematically shows a curve diagram of a magnetic domain wall position changing with time under different DMI antisymmetric effects in an integrate process of an all-electrically-controlled spintronic neuron device provided in embodiments of the present disclosure.

FIG. 7 schematically shows a curve diagram of a magnetic domain wall position changing with time under different DMI intensities in an integrate process of an all-electrically-controlled spintronic neuron device provided in embodiments of the present disclosure. A position of the magnetic domain wall may represent a distance between the magnetic domain wall and the first pinning region. A positive DMI may be a DMI vector in a +y direction, and a negative DMI may be a DMI vector in a −y direction. As shown in FIG. 7, a smaller positive DMI slightly promotes an integrate velocity of the all-electrically-controlled spintronic neuron device. A smaller negative DMI has little effect on the integrate velocity of the all-electrically-controlled spintronic neuron device. However, whether DMI is positive or negative, a larger DMI may completely inhibit the motion of the magnetic domain wall.

Figure 8:
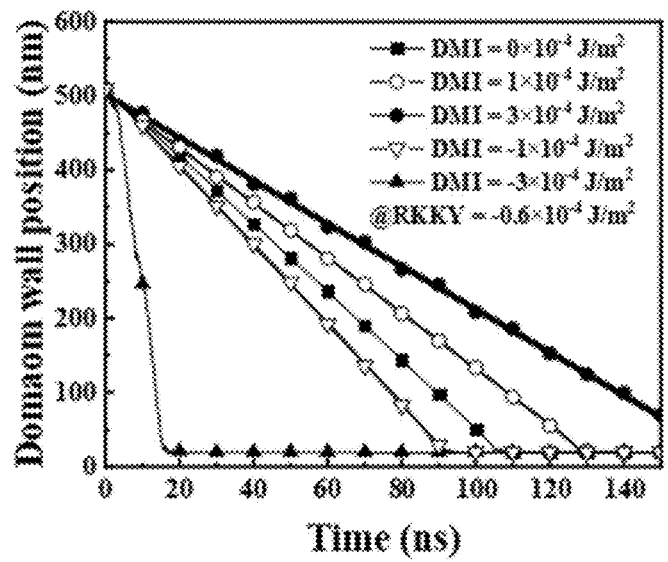
FIG. 8 schematically shows a curve diagram of a magnetic domain wall position changing with time under different DMI antisymmetric effects in a leaky process of an all-electrically-controlled spintronic neuron device provided in embodiments of the present disclosure.

According to embodiments of the present disclosure, FIG. 8 schematically shows a curve diagram of a magnetic domain wall position changing with time under different DMI intensities in a leaky process of an all-electrically-controlled spintronic neuron device provided in embodiments of the present disclosure. A position of the magnetic domain wall may represent a distance between the magnetic domain wall and the first pinning region. A positive DMI may significantly inhibit the leaky process of the neuron device, and a negative DMI may significantly promote the leaky process of the neuron device.

According to embodiments of the present disclosure, according to FIG. 7 and FIG. 8, the integrate and leaky velocity of the neuron device may be modulated by tuning the intensity of DMI.

Figure 9:
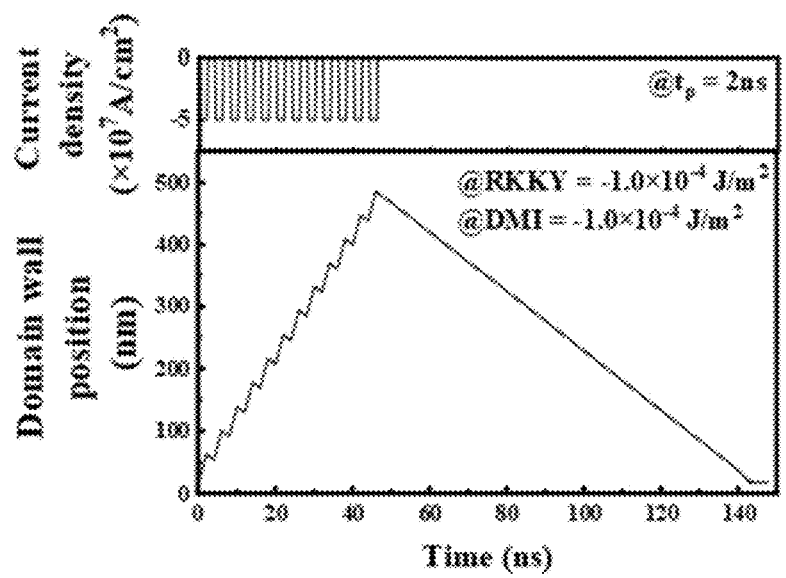
FIG. 9 schematically shows a curve diagram of a magnetic domain wall position changing with time in a process from leakage to integration to reset of an all-electrically-controlled spintronic neuron device provided in embodiments of the present disclosure.

FIG. 9 schematically shows a curve diagram of a magnetic domain wall position changing with time in a process from leakage to integration to reset of an all-electrically-controlled spintronic neuron device provided in embodiments of the present disclosure.

According to embodiments of the present disclosure, a size of the ferromagnetic free layer 107 may be 50×520 nm$^2$, sizes of the first pinning region and the second pinning region may both be 50×10 nm$^2$. Under the conditions of DMI intensity of −1×10$^4$ J/m$^2$, RKKY intensity is −1×10$^4$ J/m$^2$, 12 spin polarized current pulses with amplitude of 5×10$^7$ A/cm$^2$, pulse width of 2 ns, cycle of 4 ns are continuously applied. During the period that the amplitude of the current pulse is 5×10$^7$ A/cm$^2$, the magnetic domain wall moves in the +x direction and accumulates continuously. When the amplitude of current pulse is 0, the magnetic domain wall moves in the −x direction under the action of RKKY, thus realizing the leaky process of the neuron device. After the 12 continuous spin polarized current pulses are applied, the motion of the magnetic domain wall exceeds the threshold region, and the all-electrically-controlled spintronic neuron device discharges. At this point, the all-electrically-controlled spintronic neuron device outputs a spike signal to an output circuit. Then, the all-electrically-controlled spintronic neuron device enters an automatic retreat process. Also under the action of RKKY, the magnetic domain wall moves in the −x direction to an initial position, realizing a complete leaky-integrate-reset process. At this point, an energy consumption of the all-electrically-controlled spintronic neuron device may reach about 10 fJ/spike, which is similar to an energy consumption of the neuron in the human brain.

Another aspect of the present disclosure provides a neuron circuit including a plurality of neuron branches connected in parallel. Each neuron branch includes the neuron device provided in embodiments of the present disclosure and a circuit having a negative differential resistance characteristic connected in series.

According to embodiments of the present disclosure, a circuit having a negative differential resistance characteristic includes a transistor or a tunneling diode.

According to embodiments of the present disclosure, the circuit having a negative differential resistance characteristic may include a negative differential resistance element having a negative differential resistance characteristic, but is not limited to this, and the circuit having a negative differential resistance characteristic may include a plurality of negative differential resistance elements having a negative differential resistance characteristic.

According to embodiments of the present disclosure, the negative differential resistance element having a negative differential resistance characteristic may include a transistor or a tunneling diode.

Figure 10:
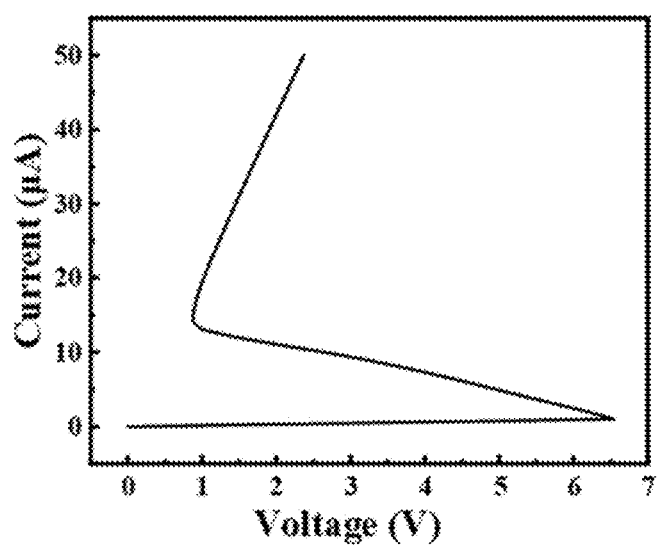
FIG. 10 schematically shows a curve diagram of a negative differential resistance characteristic provided in embodiments of the present disclosure.

According to embodiments of the present disclosure, FIG. 10 schematically shows a curve diagram of a negative differential resistance characteristic provided in embodiments of the present disclosure. With an increase of a current flowing through the negative differential resistance circuit, a voltage across the negative differential resistance circuit increases approximately linearly. When the current increases to a preset threshold, as the current continues to increase, the voltage across the negative differential resistance circuit will rapidly decrease, and the resistance of the negative differential resistance circuit will decrease with the increase of the current, that is, the negative differential resistance circuit is in a working area of the negative differential resistance. Continuing to increase the current, the voltage across the negative differential resistance circuit slowly increases approximately linearly again.

Figure 11:
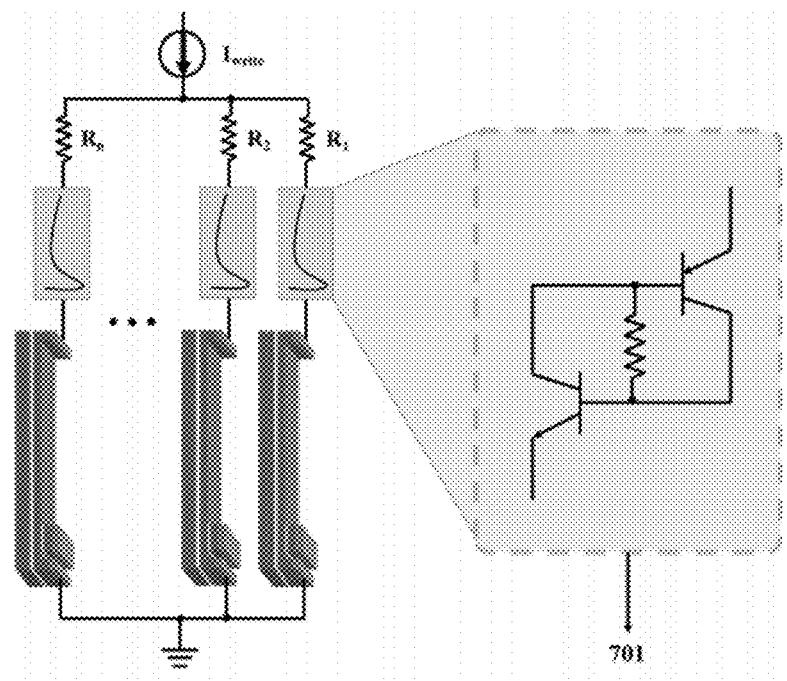
FIG. 11 shows a schematic diagram of a neuron circuit provided in embodiments of the present disclosure.

FIG. 11 shows a schematic diagram of a neuron circuit provided in embodiments of the present disclosure. As shown in FIG. 11, the current source $I_{write}$ inputs a constant current. Since the resistance values of synapse resistance R1, synapse R2 . . . synapse Rn are different, a shunt size of each branch is different. The negative differential resistance circuit of the branch with the largest current will enter the negative differential resistance working area first. At this point, the current of the negative differential resistance circuit of the branch with the largest current will increase rapidly, and the current of other branches will decrease, realizing the current difference. That is, the "winner" will obtain most of the current to write the all-electricallycontrolled spintronic neuron device, and the all-electrically-controlled spintronic neuron devices of other branches are difficult to overcome a coercive force for effective integration due to a low current, which realizes the "winner takes all" of global inhibition.

According to embodiments of the present disclosure, the synapse resistance may include a negative differential resistance element of a circuit having a negative differential resistance characteristic.

According to embodiments of the present disclosure, FIG. 11 shows an optional circuit diagram of a negative differential resistance 701. A change trend of the negative differential resistance characteristic curve may be further adjusted by adjusting the resistance value of the negative differential resistance 701, so as to obtain an appropriate global inhibition effect.

Another aspect of the present disclosure provides a neural network.

Figure 12:
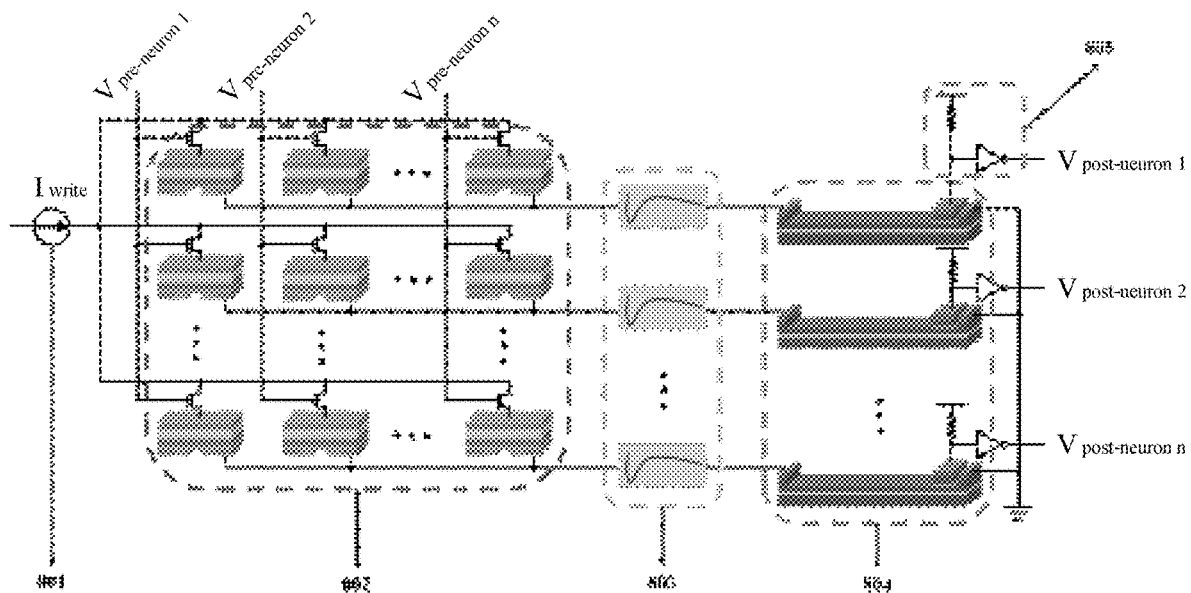
FIG. 12 shows a schematic diagram of a neural network provided in embodiments of the present disclosure.

FIG. 12 schematically shows a schematic diagram of a neural network provided in embodiments of the present disclosure. The neural network includes a neuron circuit 804, a synapse array 802 and a plurality of output circuits 805 provided in embodiments the present disclosure.

The neuron circuit 804.

The synapse array 802 includes N*M electronic synapses and a pre-neuron signal input signal line $V_{pre-neuron}$, and the pre-neuron signal input signal line is used to receive a neuron signal.

N is a row number of the synapse array 802, and M is a column number of the synapse array 820.

Input ends of N electronic synapses in a same column of the synapse array 802 are connected.

Output ends of M electronic synapses in a same row of the synapse array 802 are connected.

After output ends of M electronic synapses in a same row of the synapse array 802 are connected, the output ends are connected with one of the plurality of neuron branches of the neuron circuit 804.

After input ends of N electronic synapses in a same column of the synapse array 802 are connected, the input ends are connected with one of the M pre-neuron signal input signal lines $V_{pre-neuron}$.

The plurality of output circuits 805, wherein an input end of each output circuit 805 in the plurality of output circuits 805 is connected with an output end of one of the neuron branches in the neuron circuit 804.

According to embodiments of the present disclosure, the electronic synapse may include a magnetic tunnel junction.

According to embodiments of the present disclosure, in an actual application process, the neural network provided in embodiments of the present disclosure is usually cascaded with an upper level neural network. When a neuron signal of the upper level neural network arrives, a transistor connected to a pre-neuron signal input signal line $V_{pre-neuron}$ of the synapse array 802 corresponding to the neuron signal is turned on. At the same time, a current source $I_{write}$ 801 generates a constant current that flows through the pre-neuron signal input signal line $V_{pre-neuron}$, thus turning on a row of electronic synapses corresponding to the pre-neuron signal input signal line $V_{pre-neuron}$ with the current flowing through. Since the weight of each electronic synapse is different, that is, the resistance of each electronic synapse is different, the current flowing through each branch is different. Due to the existence of negative differential resistance circuit, the negative differential resistance circuit of the branch where the maximum current is located will first reach the negative differential resistance region, so that the voltage cross the circuit is clamped at a lower level, the current of other branches is rapidly reduced, and the current of the branch is significantly increased, so as to achieve the "winner takes all" of the all-electrically-controlled spintronic neuron devices of the branch. After a series of pulses from the all-electrically-controlled spintronic neuron device in the previous stage neural network, a certain all-electrically-controlled spintronic neuron device in this stage will discharge first, and output a spike pulse through the output circuit to achieve a complete pulse neural network function.

Based on the technical solutions described above, compared with the related art, the present disclosure has at least one or part of the following beneficial effects:

1. Under the regulation and control of the full electric field, through the antiferromagnetic coupling effect between the ferromagnetic free layer and the bottom ferromagnetic layer in the synthetic antiferromagnetic layer, an automatic retreat movement of the magnetic domain wall in the ferromagnetic free layer is realized to simulate a self-leaky function of the neuron device. Then, when a current is injected, the spin orbit torque is used to drive a motion of the magnetic domain wall in the ferromagnetic free layer to simulate an integrate function of the neuron device, and then the neuron device with highly reliable leaky-integrate-reset characteristics is integrated and realized;

2. The all-electrically-controlled spintronic neuron device based on the magnetic tunnel junction may realize an accumulation of current pulses from synapses under the regulation and control of the full electric field, which has both high energy efficiency and high reliability self-leaky functions. When the accumulated current pulses drive the magnetic domain wall to move and exceed a threshold value, the neuron device will discharge and emit a spike signal to simulate a function of a human brain neuron;

3. The all-electrically-controlled spintronic neuron device may be combined with an electronic component having a negative differential characteristic to form a WTA neuron array;

4. The all-electrically-controlled spintronic neuron device may be combined with a synapse array based on the magnetic tunnel junction and a peripheral circuit to form a pulse neural network, so as to achieve a certain neuromorphic computing function.

The specific embodiments described above further detail the objectives, technical solutions and beneficial effects of the present disclosure. It should be understood that the above are only specific embodiments of the present disclosure, and are not intended to limit the scope of the present disclosure, and any modifications, equivalent substitutions, improvements and the like made within the spirit and principle of the present disclosure should all fall within the protection scope of the present disclosure.

What is claimed is:

1. An all-electrically-controlled spintronic neuron device, comprising:
   a bottom antiferromagnetic pinning layer;
   a synthetic antiferromagnetic layer formed on the bottom antiferromagnetic pinning layer, wherein the synthetic antiferromagnetic layer comprises a bottom ferromagnetic layer, a synthetic antiferromagnetic coupling layer and a ferromagnetic free layer from bottom to top;
   a potential barrier layer formed on the ferromagnetic free layer, wherein a region of the ferromagnetic free layer directly opposite to the potential barrier layer forms a threshold region;

a ferromagnetic reference layer formed on the potential barrier layer, wherein the potential barrier layer, the ferromagnetic reference layer and the ferromagnetic free layer form a magnetic tunnel junction;

a first antiferromagnetic pinning layer and a second antiferromagnetic pinning layer formed on an exposed region of the ferromagnetic free layer except the region directly opposite to the potential barrier layer, and located on two sides of the potential barrier layer, wherein regions of the ferromagnetic free layer directly opposite to the first antiferromagnetic pinning layer and the second antiferromagnetic pinning layer form a first pinning region and a second pinning region respectively;

a first electrode formed on and in direct contact with the ferromagnetic reference layer, and a second electrode and a third electrode formed on and in direct contact with an exposed region of the synthetic antiferromagnetic coupling layer except the ferromagnetic free layer.

2. The neuron device according to claim 1,
wherein the second electrode and the third electrode are located on two sides of the synthetic antiferromagnetic coupling layer,
wherein a material of the synthetic antiferromagnetic coupling layer comprises at least one of:
Ru, V, Cr, Rh, Nd, Mo, or Re.

3. The neuron device according to claim 2,
wherein a spin orbit torque is generated in the ferromagnetic free layer due to a spin orbit coupling effect by injecting a current between the second electrode and the third electrode, so as to drive a motion of a magnetic domain wall in the ferromagnetic free layer and simulate an integrate process of the neuron;
wherein the first pinning region and the second pinning region have opposite magnetization directions; when the magnetic domain wall moves between the first pinning region and the threshold region, the neuron device is in a normal state;
when the magnetic domain wall moves between the threshold region and the second pinning region, the neuron device is in an excited state.

4. The neuron device according to claim 3, wherein when a moving position of the magnetic domain wall in the ferromagnetic free layer exceeds the threshold region, the magnetic tunnel junction is switched from an antiparallel state to a parallel state and outputs a spike pulse, so as to simulate a leaky process of the neuron;
when a strength of an antiferromagnetic coupling effect on the ferromagnetic free layer is fixed, and a density of the current is increased, an integrate velocity of the neuron is accelerated;
when the strength of the antiferromagnetic coupling effect on the ferromagnetic free layer is increased, a leaky velocity of the neuron is accelerated.

5. The neuron device according to claim 3, wherein the bottom antiferromagnetic pinning layer has a first magnetization direction;
the bottom antiferromagnetic pinning layer is configured to pin a magnetization direction of the bottom ferromagnetic layer in a second magnetization direction, and an antiferromagnetic coupling effect is generated on the ferromagnetic free layer by the synthetic antiferromagnetic coupling layer, wherein the magnetic domain wall in the ferromagnetic free layer has a movement trend opposite to a current driving direction, so as to simulate a leaky process of the neuron, wherein the second magnetization direction is opposite to the first magnetization direction;
a magnetization direction of the first pinning region or a magnetization direction of the second pinning region is the same as the first magnetization direction.

6. A neuron circuit, comprising a plurality of neuron branches connected in parallel;
wherein each of the neuron branches comprises the neuron device according to claim 1 and a circuit having a negative differential resistance characteristic connected in series;
the circuit having a negative differential resistance characteristic comprises a transistor or a tunneling diode.

7. A neural network, comprising:
the neuron circuit according to claim 6 ;
a synapse array, comprising N*M electronic synapses and M pre-neuron signal input signal lines, wherein the pre-neuron signal input signal line is configured to receive a neuron signal;
wherein N is a row number of the synapse array, and M is a column number of the synapse array;
input ends of N electronic synapses in a same column of the synapse array are connected;
output ends of M electronic synapses in a same row of the synapse array are connected;
wherein, after output ends of M electronic synapses in a same row of the synapse array are connected, the output ends are connected with one of the plurality of neuron branches of the neuron circuit;
wherein, after input ends of N electronic synapses in a same column of the synapse array are connected, the input ends are connected with one of the M pre-neuron signal input signal lines;
a plurality of output circuits, wherein an input end of each output circuit in the plurality of output circuits is connected with an output end of one of the neuron branches in the neuron circuit.

8. The neuron device according to claim 1, wherein a material of the potential barrier layer comprises at least one of: MgO or $Al_2O_3$;
a material of the ferromagnetic reference layer comprises at least one of: CoFeB, Co/Pt, CoFeAl, Co/Pd, or CoFe;
a material of the ferromagnetic free layer comprises at least one of: CoFeB, Co/Pt, CoFeAl, Co/Pd, or CoFe;
a material of the bottom ferromagnetic layer comprises at least one of: CoFeB, Co/Pt, CoFeAl, Co/Pd, or CoFe;
a material of the first antiferromagnetic pinning layer and the second antiferromagnetic pinning layer comprises at least one of: IrMn, FeMn, NiMn, CoMn, PtMn, Mn2Au, NiO, or MnO; and
a material of the bottom antiferromagnetic pinning layer comprises at least one of: IrMn, FeMn, NiMn, CoMn, PtMn, $Mn_2Au$, NiO, or MnO.

9. An all-electrically-controlled spintronic neuron device, comprising:
a bottom antiferromagnetic pinning layer;
a synthetic antiferromagnetic layer formed on the bottom antiferromagnetic pinning layer, wherein the synthetic antiferromagnetic layer comprises a bottom ferromagnetic layer, a synthetic antiferromagnetic coupling layer and a ferromagnetic free layer from bottom to top;
a potential barrier layer formed on the ferromagnetic free layer, wherein a region of the ferromagnetic free layer directly opposite to the potential barrier layer forms a threshold region;

a ferromagnetic reference layer formed on the potential barrier layer, wherein the potential barrier layer, the ferromagnetic reference layer and the ferromagnetic free layer form a magnetic tunnel junction;

a first antiferromagnetic pinning layer and a second antiferromagnetic pinning layer formed on an exposed region of the ferromagnetic free layer except the region directly opposite to the potential barrier layer, and located on two sides of the potential barrier layer, wherein regions of the ferromagnetic free layer directly opposite to the first antiferromagnetic pinning layer and the second antiferromagnetic pinning layer form a first pinning region and a second pinning region respectively;

a first electrode formed on and in direct contact with the ferromagnetic reference layer, and a second electrode and a third electrode respectively formed on and in direct contact with the first antiferromagnetic pinning layer and the second antiferromagnetic pinning layer, wherein a material of the synthetic antiferromagnetic coupling layer comprises at least one of: Ta or W.

10. The neuron device according to claim 9, a spin transfer torque is generated in the ferromagnetic free layer by injecting a current between the second electrode and the third electrode, so as to drive a motion of a magnetic domain wall in the ferromagnetic free layer and simulate an integrate process of the neuron;

wherein the first pinning region and the second pinning region have opposite magnetization directions; when the magnetic domain wall moves between the first pinning region and the threshold region, the neuron device is in a normal state; and when the magnetic domain wall moves between the threshold region and the second pinning region, the neuron device is in an excited state.

11. The neuron device according to claim 10, wherein when a moving position of the magnetic domain wall in the ferromagnetic free layer exceeds the threshold region, the magnetic tunnel junction is switched from an antiparallel state to a parallel state and outputs a spike pulse, so as to simulate a leaky process of the neuron;

when a strength of an antiferromagnetic coupling effect on the ferromagnetic free layer is fixed, and a density of the current is increased, an integrate velocity of the neuron is accelerated;

when the strength of the antiferromagnetic coupling effect on the ferromagnetic free layer is increased, a leaky velocity of the neuron is accelerated.

12. The neuron device according to claim 10, wherein the bottom antiferromagnetic pinning layer has a first magnetization direction;

the bottom antiferromagnetic pinning layer is configured to pin a magnetization direction of the bottom ferromagnetic layer in a second magnetization direction, and an antiferromagnetic coupling effect is generated on the ferromagnetic free layer by the synthetic antiferromagnetic coupling layer, wherein the magnetic domain wall in the ferromagnetic free layer has a movement trend opposite to a current driving direction, so as to simulate a leaky process of the neuron, wherein the second magnetization direction is opposite to the first magnetization direction;

a magnetization direction of the first pinning region or a magnetization direction of the second pinning region is the same as the first magnetization direction.

\* \* \* \* \*